L. YALE, Jr., dec'd.

S. N. Brooks, Administrator, Assignor to the Yale Lock Manufacturing Co.

POST OFFICE BOX.

No. 7,625. Reissued April 24, 1877.

WITNESSES

Wm A Skinkle

F. Falk

INVENTOR

Silas N Brooks
Administrator of the Estate of
Linus Yale Jr. deceased

By his Attorneys

Baldwin, Hopkins & Peyton.

UNITED STATES PATENT OFFICE.

SILAS N. BROOKS, OF CHICAGO, ILLINOIS, ADMINISTRATOR OF LINUS YALE, JR., DECEASED, ASSIGNOR TO THE YALE LOCK MANUFACTURING COMPANY, OF STAMFORD, CONNECTICUT.

IMPROVEMENT IN POST-OFFICE BOXES.

Specification forming part of Letters Patent No. 119,212. dated September 19, 1871; reissue No. 4,963, dated July 9, 1872; reissue No. 7,625, dated April 24, 1877; application filed April 19, 1875.

*To all whom it may concern:*

Be it known that LINUS YALE, Jr., deceased, late of Shelburne Falls, in the county of Franklin and State of Massachusetts, during his lifetime invented a new and useful Improvement in Post-Office Boxes; and I, SILAS N. BROOKS, administrator of the estate of the said LINUS YALE, Jr., deceased, do hereby declare the following to be a full, clear, and exact description thereof, sufficient to enable others skilled in the arts to understand, construct, and use the same, reference being had to the accompanying drawing, forming a part of this specification, in which—

Figure 1:
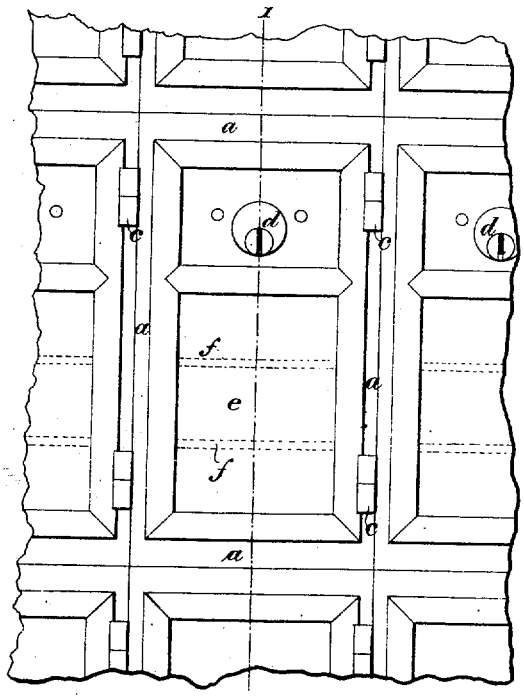
Figure 2:
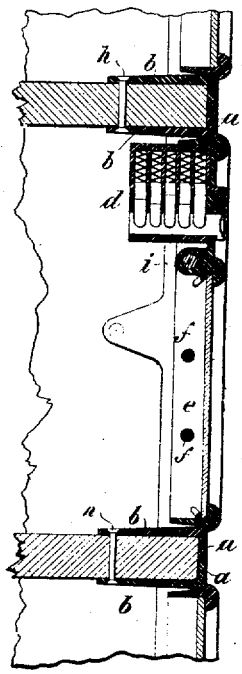
Figure 3:
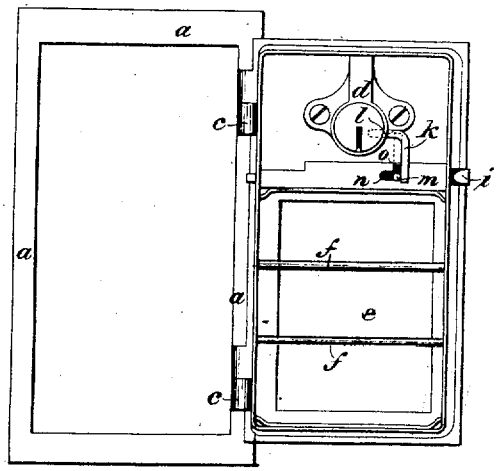

Figure 1 is an elevation taken from the front or delivery side of a series of boxes. Fig. 2 is a vertical section through the same, and Fig. 3 is a front elevation of a single box-frame with the door open.

This invention relates to an improvement in post-office lock-boxes; and consists in constructing the front, for closing the outer ends of such boxes respectively, of metal doors and frames suitably hinged together, the frames so arranged as to overlap and cover, in whole or in part, the front edges of the boxes to which they are to be secured. My invention also consists in providing suitable means for securing such frames to the boxes.

Lock-boxes have heretofore been made in which the doors were attached directly to the front ends of the boxes, as shown in the patent of Jacob H. Beidler, No. 57,464, granted August 28, 1866; but the hinging of the doors directly to the sides of the boxes is troublesome and insecure, because it leaves the edges of the boxes exposed to convenient attack.

The body of the boxes may be made of wood, in the usual manner, but the door and door-frame, which compose the front of the boxes respectively, are made of iron or other suitable metal. Each door-frame is so made that it aids in covering the edges of the wooden partitions forming the walls of the boxes, and is connected with other frames above, below, and on each side of it, in such a manner that the frames will make a continuous metallic frontage, no part of which can be removed from the outside without pulling down other parts. Each frame, made as before stated of metal, has all around it a flange, *a a*, which protects the outside or edges of the wood-work. The sides of the frames *b b* enter and fit closely against the wood forming the pigeon-holes, and may be continuous or notched out at intervals, and each frame has attached to it one leaf of two or more hinges, *c c*. The door may be of any desirable metal, solid where the lock *d* is attached, and having an opening, *e*, below, in which a plate of glass is secured. I prefer to locate rods *f f* behind the plate, to prevent the introduction of a hand, if the glass be broken. The door is so constructed that when shut it enters within the frame, so that it cannot be lifted from its hinges. When the frames are all in place each frame is riveted through the wood-work to its four neighbors, (see *h h*, Fig. 2,) and in this way a continuous metal frontage is formed. The door for each frame has a small spring-bolt, *i*, and a lock, *d*, attached to it. An arm, *k*, of wire or other material, is attached to the turning mechanism of the lock *d*, through a slot, *l*, made in the casing, in which the tumblers, &c., are placed. This arm is bent at its free end, and engages with a pin, *m*, which is attached to bolt *i*. The casing of this bolt is slotted horizontally at *n* and vertically at *o*, in which slots the pin *m* moves to push out and draw in the bolt, and to lock it when pushed or thrown out.

This device forms, in the hands of the postmaster, a perfect safeguard against all entrance to the box by means of the key, as is more particularly set forth in Letters Patent granted to me on the 24th day of October, 1871, and numbered 120,177.

What I claim as the invention of the said LINUS YALE, Jr., deceased, is—

1. As a new article of manufacture, a metallic front for post-office lock-boxes, consisting of a frame and door suitably hinged together, and provided with a lock for controlling said door from the outside, the said front being adapted to fit and close one end of a box, the other end of which is open for the insertion of mail matter, substantially as specified.

2. The combination, substantially as specified, of several door-frames and doors with post-office boxes, whereby a continuous metallic frontage is formed.

3. The combination, substantially as specified, of two or more metallic frames and doors with post-office boxes, said frames having flanges which protect and inclose the front edges of the pigeon-hole.

4. The combination, substantially as specified, of two or more metallic frames and doors with post-office boxes, the frames connected together by means of rivets passing through them and through the wood-work of the pigeon-holes.

5. The combination, substantially as specified, of a metallic door, provided with a glass panel and a metallic pigeon-hole frame to which the door is hinged.

6. The combination of a post-office box, open at the rear end, and a metallic frame secured to the front end of it, substantially as specified.

SILAS N. BROOKS,
*Administrator of the estate of Linus Yale, Jr., deceased.*

Witnesses:
C. C. KOHLSBAT,
J. W. EDDY.